March 28, 1961    P. H. R. WALDRON ET AL    2,976,834
MARINE HEAT EXCHANGER
Filed Dec. 4, 1958

INVENTORS
PAUL H. R. WALDRON
SAM SCHLEIFER
BY
*Arthur H. Seidel*
ATTORNEY

United States Patent Office
2,976,834
Patented Mar. 28, 1961

2,976,834
MARINE HEAT EXCHANGER
Paul H. R. Waldron, % Mitchell College, and Sam Schleifer, 37 Fowler Court, both of New London, Conn.

Filed Dec. 4, 1958, Ser. No. 778,226

3 Claims. (Cl. 115—.5)

This invention relates to a marine heat exchanger, and more particularly to a heat exchanger for use in cooling the engine of an inboard motor vessel. Even more particularly, the present invention relates to a heat exchanger for inboard motor vessels which is a part of the design of the hull of the vessel.

For cooling the engines of inboard motor vessel, particularly the smaller vessels, it is the common practice to use the water which surrounds the vessel. The raw cool water is pumped through the engine and the heated water returned to the surrounding medium. Where the coolant is sea water, the salt in the water has a corrosive reaction with the engine which rapidly reduces the life of the engine. A survey by the boating industry found that engines cooled by salt water deteriorate at least five times as rapidly as engines cooled by fresh water. Also, the salt water attacks the water pump, causing failure of the pump at most unpredictable times. Such failure is a major hazard in boating.

Another cooling system which has been used in an attempt to overcome the hazards of directly using the surrounding water, uses an inboard heat exchanger. A closed system pumps fresh water through the heat exchanger and the engine. A second system pumps the surrounding water through the heat exchanger to cool the fresh water. However, this system is bulky in that it requires an inboard heat exchanger and two separate pumping systems. Also, the heat exchanger and the salt water pump are subject to corrosion by the salt water.

It is an object of the present invention to provide an improved heat exchanger for the engine of an inboard motor vessel.

It is another object of the present invention to provide a heat exchanger for inboard motor vessels which is directly cooled by the water surrounding the vessel.

It is still another object of the present invention to provide a heat exchanger for inboard motor vessels which forms a part of the design of the hull of the vessel.

It is a further object of the present invention to provide a heat exchanger for inboard motor vessels which is relatively small and which rapidly cools the coolant for the engine.

It is still a further object of the present invention to provide a heat exchanger for inboard motor vessels which does not add any drag or any appreciable additional weight to the vessel.

Other objects will appear hereinafter.

For the purpose of illustrating the invention there is shown in the drawings a form which is presently preferred; it being understood, however, that this invention is not limited to the precise arrangements and instrumentalities shown.

Figure 1:
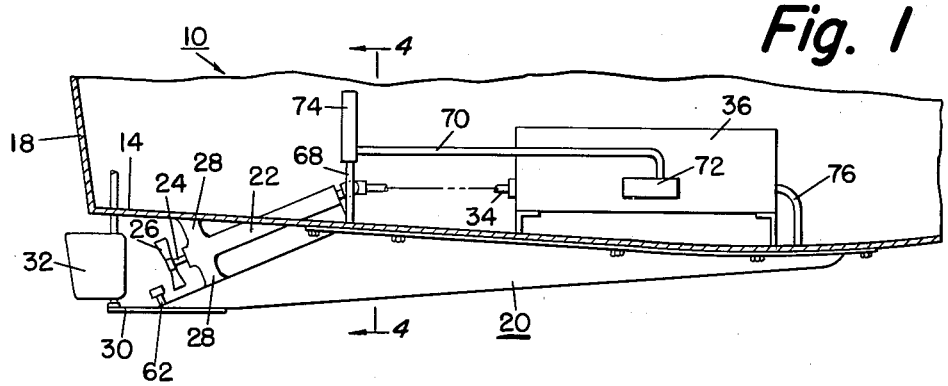
Figure 1 is a sectional view of the hull of a vessel which includes the heat exchanger of the present invention.
Figure 2:
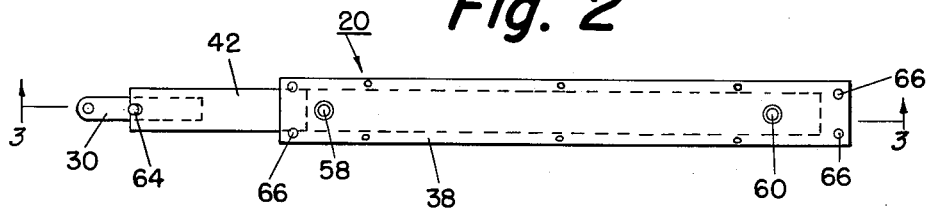
Figure 2 is a top elevational view of the heat exchanger of the present invention.
Figure 4:
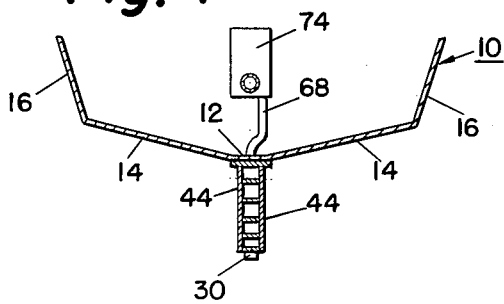
Figure 4 is a sectional view taken along line 4—4 of Figure 1.

Referring initially to Figures 1 and 4 of the drawing, the hull of the vessel is generaly designated as 10. Hull 10 comprises a keel 12 having a bottom 14 extending upwardly and outwardly from each side of the keel 12. Sides 16 extend upwardly from the bottom 14. A transom 18 extends upwardly from the aftermost end of bottom 14, and extends between the sides 16. The heat exchanger 20 of the present invention extends downwardly from the keel 12.

A stuffing box 22 for the shaft 24 of the propeller 26 extends rearwardly through the keel 12 or bottom 14 of the hull 10. The outer end of stuffing box 22 is supported between the heat exchanger 20 and the keel 12 or bottom 14 by supporting posts 28. A skeg 30 extends rearwardly from the heat exchanger 20, and a rudder 32 is pivotably connected between the end of skeg 30 and the keel 12 or bottom 14 of the hull 10. Propeller shaft 24 is connected to the drive shaft 34 of the engine 36. For simplicity, engine 36 is shown mounted on the bottom 14 of the hull 10. However, the engine 36 may be mounted on a deck of the vessel or in any suitable place in the vessel.

Figure 3:
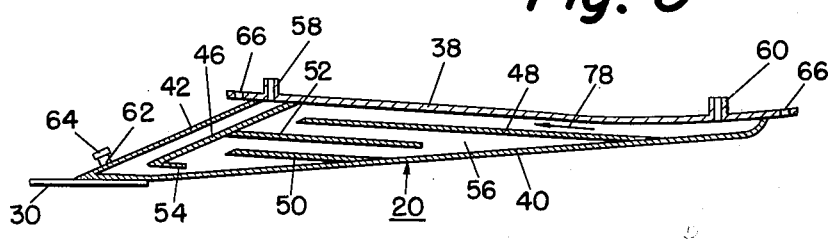
Figure 3 is a sectional view taken along line 3—3 of Figure 2.

Referring to Figures 3 and 4, the heat exchanger 20 of the present invention comprises a substantially rectangular top plate 38 which is long and narrow. The configuration of top plate 38 conforms to the configuration of the keel 12. A substantially rectangular bottom plate 40 is secured at one end to the top plate 38 adjacent the forward end of the top plate 38. Bottom plate 40 extends longitudinally along and downwardly away from the top plate 38. Bottom plate 40 extends longitudinally beyond the rear end of top plate 38. A substantially rectangular end plate 42 connects the rearmost end of bottom plate 40 to the top plate 38 adjacent the rearmost end of the top plate 38. Side plates 44 extend between the top plate 38 and the bottom plate 40 to completely enclose the heat exchanger 20.

A baffle plate 46 extends between the side plates 44 from the top plate 38 to a point spaced from the bottom plate 40. Baffle plate 46 is substantially parallel to and spaced from end plate 42. A pair of parallel, longitudinally extending baffle plates 48 and 50 extend between the side plates 44 from the bottom plate 40 to points spaced from the baffle plate 46. Another pair of parallel, longitudinally extending baffle plates 52 and 54 extend between the side plates 44 from the baffle plate 46 to points spaced from bottom plate 40. Baffle plate 52 extends between baffle plates 48 and 50, and baffle plate 54 is below baffle plate 50. Thus the baffle plates form a continuous labyrinth passage 56 which extends longitudinally back and forth across the heat exchanger 20 and then upwardly along the rearmost end of the heat exchanger 20. Top plate 38 has a port 58 extending through its rear end into the space between the end plate 42 and the baffle plate 46. A second port 60 extends through the forward end of top plate 38 into the space between the baffle plate 48 and the top plate 38. A drain pipe 62 extends through the bottom end of end wall 42 into the labyrinth passage 56, and a cap 64 fits tightly on the drain pipe 62.

Heat exchanger 20 is fabricated entirely of metal to provide for good conduction of heat. The top plate 38 of heat exchanger 20 is secured to the bottom of keel 12 by bolts or the like which extend through holes 66 in the ends of the top plate 38 which project beyond the end plate 42 and the bottom plate 40. However, if the vessel is originally constructed with the heat exchanger 20 of the present invention, the heat exchanger 20 may be constructed as a part of the keel 12 with the keel 12 acting the top plate 38.

As shown in Figure 1, the port 58 of the heat exchanger 20 is connected by pipes 68 and 70 to a water pump 72. A fill pipe 74 is connected between pipe 68 and pipe 70. Fill pipe 74 is larger in diameter than the pipes 68 and 70 so that the fill pipe 74 will serve as an expansion chamber. Pump 72 is connected to the inlet end of the cooling chamber of engine 36. A pipe 76 connects the outlet end of the cooling chamber of engine 36 to the port 60 of heat exchanger 20. Thus the heat exchanger 20, pipes 68, 70, and 76, and engine 36 form a closed system for circulating fresh cooling water through the engine 36 and the heat exchanger 20.

The operation of the cooling system which incorporates the heat exchanger 20 of the present invention is as follows:

The system is filled with fresh water through fill pipe 74. Pump 72 draws cool water from the heat exchanger 20 through port 58, pipes 68 and 70, and forces the cool fresh water through the cooling system of the engine 36. The warm water from the engine 36 is forced through the pipe 76 back into the heat exchanger 20 through port 60.

In the heat exchanger 20, the warm water from the engine 36 enters the foremost end of the heat exchanger 20 through the port 60. The water then flows longitudinally through the uppermost portion of the labyrinth passage 56 between top plate 38 and baffle 48 in the direction of arrow 78. The water flows through the labyrinth passage 56 longitudinally back and forth across the heat exchanger 20 and downwardly toward the bottom rearmost end of the heat exchanger 20. As the water passes through the labyrinth passage 56, the water is cooled by the induction of heat from the water through the side plates 44 of the heat exchanger 20 to the cooler water surrounding the heat exchanger 20. The cool water from the bottom rearmost corner of the heat exchanger 20 is drawn up between end plate 42 and baffle plate 46 to the port 58, and then back to the engine 36.

In a vessel containing both warm and cool water, the warm water would normally rise to the top of the vessel and remain on top. However, in the heat exchanger 20 of the present invention, the warm water entering the top of the heat exchanger 20 is forced longitudinally back and forth and downwardly through the labyrinth passage 56. Thus, all the water is brought into direct contact with substantially the entire surfaces of the side walls 44 of the heat exchanger 20. This provides for the rapid cooling of the water in a heat exchanger which is of relatively small volume. Also, the baffles of the heat exchanger 20 of the present invention divide the cool water leaving the heat exchanger 20 from the warm water entering the heat exchanger 20. This prevents heating of the cooled water by convection of heat from the warm water.

The tapered design of the heat exchanger 20 of the present invention conforms to the design of the hull 10 of the vessel. Thus, the heat exchanger 20 does not add any drag to the vessel, yet extends into the water surrounding the vessel for proper cooling of the heat exchanger 20. Also, since the heat exchanger 20 of the present invention is relatively small in volume, it does not add any appreciable additional weight to the vessel.

The present invention may be embodied in other specific forms without departing from the spirit or essential attributes thereof and, accordingly, reference should be made to the appended claims, rather than to the foregoing specification as indicating the scope of the invention.

We claim:

1. A marine heat exchanger comprising a substantially rectangular, metal top plate, a rectangular metal bottom plate secured at its forward end to the forward end of said top plate and extending longitudinally beneath and downwardly away from said top plate, a metal end plate connected between the rear end of said bottom plate and the rear end of said top plate, a pair of parallel side plates connected between said top plate and said bottom plate, said top plate, bottom plate, end plate, and side plates forming an enclosed chamber, baffles means extending between said side plates and forming a labyrinth passage which extends longitudinally back and forth through the chamber from the forward end of said top plate to the rear end of said bottom plate so that a liquid flowing through said passage must flow adjacent to said bottom plate at spaced points along said bottom plate, and a pair of longitudinal spaced ports through said top plate, one of said ports opening into one end of said passage and the other port opening into the other end of said passage.

2. A marine heat exchanger comprising a substantially rectangular metal top plate, a rectangular metal bottom plate secured at its forward end to the forward end of said top plate and extending longitudinally beneath and downwardly away from said top plate, a metal end plate connected between the rear end of said bottom plate and the rear end of said top plate, a pair of parallel side plates connected between said top plate and said bottom plate, said top plate, bottom plate, end plate, and side plates forming an enclosed chamber, a first baffle plate extending between said side plates and downwardly from said top plate to just above said bottom plate, said first baffle plate being parallel to and adjacent said end plate but spaced from said end plate, a second baffle plate extending between said side plates and longitudinally from said bottom plate to a point spaced from said first baffle plate, a third baffle plate extending between said side plates and longitudinally from said first baffle plate to a point spaced from said bottom plate, said third baffle plate being substantially parallel to and spaced below said second baffle plate, said baffle plates forming a labyrinth passage through said chamber, a port through the rear end of said top plate opening into the space between said end plate and the first baffle plate, and a port through the forward end of said top plate opening into the space between said top plate and the second baffle plate.

3. A heat exchanger in accordance with claim 2 including a fourth baffle plate below said third baffle plate extending between the side plates and longitudinally from said bottom plate to a point spaced from said first baffle plate, and a fifth baffle plate below said fourth baffle plate extending between said side plates and longitudinally from said first baffle plate to a point spaced from said bottom plate.

References Cited in the file of this patent

UNITED STATES PATENTS

| 2,386,803 | Jutte | Oct. 16, 1945 |
| 2,387,700 | Cribb | Oct. 23, 1945 |
| 2,859,634 | Walter | Nov. 11, 1958 |

FOREIGN PATENTS

| 26,788 | Great Britain | Nov. 18, 1909 |
| 485,095 | Italy | Sept. 29, 1953 |